US008182582B2

United States Patent
Yu et al.

(10) Patent No.: US 8,182,582 B2
(45) Date of Patent: May 22, 2012

(54) GAS STORAGE MEDIUM, GAS STORAGE APPARATUS AND METHOD THEREOF

(75) Inventors: Han-Young Yu, Daejon (KR); Ansoon Kim, Daejon (KR); Jong-Heon Yang, Daejon (KR); In-Bok Baek, Chungbuk (KR); Chang-Geun Ahn, Daejon (KR); Chil-Seong Ah, Daejon (KR); Chan-Woo Park, Daejon (KR); Seongjae Lee, Daejon (KR); Taehyoung Zyung, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 394 days.

(21) Appl. No.: 12/518,084

(22) PCT Filed: Dec. 6, 2007

(86) PCT No.: PCT/KR2007/006310
§ 371 (c)(1),
(2), (4) Date: Jun. 5, 2009

(87) PCT Pub. No.: WO2008/069590
PCT Pub. Date: Jun. 12, 2008

(65) Prior Publication Data
US 2011/0017613 A1    Jan. 27, 2011

(30) Foreign Application Priority Data

Dec. 6, 2006 (KR) .......................... 10-2006-0123238
Sep. 18, 2007 (KR) .......................... 10-2007-0094685

(51) Int. Cl.
*B01D 53/02* (2006.01)
*B01J 20/00* (2006.01)

(52) U.S. Cl. .............. 95/90; 96/146; 429/515; 977/762; 977/811; 502/526

(58) Field of Classification Search .............. 95/90, 115, 95/116, 148; 96/108, 146; 206/0.6, 0.7; 423/648.1, 658.2; 429/416, 515; 977/762, 977/811, 962; 502/526
See application file for complete search history.

(56) References Cited

U.S. PATENT DOCUMENTS

| | | | |
|---|---|---|---|
| 5,196,048 A | | 3/1993 | Antrim et al. |
| 5,653,951 A | * | 8/1997 | Rodriguez et al. ............ 423/439 |

(Continued)

FOREIGN PATENT DOCUMENTS

CN    1481275 A    3/2004

(Continued)

OTHER PUBLICATIONS

Ying Wang et al., "Synthesis and Enhanced Intercalation Properties of Nanostructured Vanadium Oxides", Chemistry of Materials, American Chemical Society, vol. 18, No. 12, pp. 2787-2804, May 12, 2006.

(Continued)

Primary Examiner — Frank Lawrence, Jr.
(74) Attorney, Agent, or Firm — Rabin & Berdo, P.C.

(57) ABSTRACT

Provided are gas storage medium, a gas storage apparatus having the same and a method thereof. The gas storage medium includes a plurality of material layers each having a variable valence, wherein each of the material layers includes redundant electrons that are not participated in chemical bonding.

25 Claims, 7 Drawing Sheets

U.S. PATENT DOCUMENTS

| | | | |
|---|---|---|---|
| 6,231,744 | B1 | 5/2001 | Ying et al. |
| 6,337,146 | B1 | 1/2002 | Sogabe et al. |
| 6,465,132 | B1 | 10/2002 | Jin |
| 6,672,077 | B1 | 1/2004 | Bradley et al. |
| 7,026,058 | B2 | 4/2006 | Towata et al. |
| 7,135,057 | B2 * | 11/2006 | Kornilovich ............ 95/90 |
| 7,393,393 | B2 * | 7/2008 | Nazri ............... 96/108 |
| 2004/0161360 | A1 | 8/2004 | Ogawa et al. |
| 2004/0209144 | A1 | 10/2004 | Kornilovich |
| 2006/0131574 | A1 | 6/2006 | Yu et al. |
| 2008/0248355 | A1 * | 10/2008 | Katamura et al. ........ 429/27 |

FOREIGN PATENT DOCUMENTS

| | | |
|---|---|---|
| JP | 2004-196572 A | 7/2004 |
| JP | 2005-288262 | 10/2005 |
| KR | 2001-0091479 | 10/2001 |
| KR | 2005-0077680 | 8/2005 |
| KR | 2005-0095828 | 10/2005 |
| WO | WO 02/056396 A2 | 7/2002 |
| WO | WO-2004-057070 | 7/2004 |
| WO | WO-2005/105663 A1 | 11/2005 |

OTHER PUBLICATIONS

Fangyi Cheng et al., Storage of Hydrogen and Lithium in Inorganic Nanotubes and Nanowires, Journal of Materials Research, Materials Research Society, vol. 21, No. 11, pp. 2744-2757, Nov. 2006.

Hui Pan et al., "Hydrogen Storage of ZnO and Mg Doped ZnO Nanowires", Nanotechnology, vol. 17, No. 12, pp. 2963-2967, XP020103810, May 30, 2006.

Nicola Pinna et al., "Divanadium Pentoxide Nanorods", Advanced Materials, vol. 15, No. 3, pp. 329-331, XP55014671, Feb. 17, 2003.

Q. Wan et al., "Room-Temperature Hydrogen Storage Characteristics of ZnO Nanowires", Applied Physics Letters, vol. 84, No. 1, pp. 124-126, Jan. 5, 2004.

* cited by examiner

GAS STORAGE MEDIUM, GAS STORAGE APPARATUS AND METHOD THEREOF

TECHNICAL FIELD

The present invention relates to a gas storage medium, a gas storage apparatus having the same and a method thereof; and, more particularly, to a hydrogen storage medium, a hydrogen storage apparatus having the same, and a method thereof.

BACKGROUND ART

The use of fossil fuel such as oil has generated a serious pollution problem and induced a global warming problem. In order to overcome such problems, hydrogen has been receiving attention as an alternative fuel. The hydrogen can be created from water that unlimitedly exists in the earth. The hydrogen is transformed back to the water again after generating energy.

Therefore, the water will not be dried up forever. When the hydrogen is combusted, pollutants are not generated except the generation of the extremely small amount of nitrous oxide. Accordingly, the hydrogen has been considered as clean energy. Also, the hydrogen can be transformed to various types of energy. For example, the hydrogen is transformed to heat energy through combustion. The hydrogen is also transformed to mechanical energy through an internal combustion engine, or to electrical energy through reaction with oxygen as fuel battery.

However, the hydrogen has not been widely used although the hydrogen has many advantages as described above. One of reasons for not widely using the hydrogen is the difficulty of safely storing the hydrogen at high density. Accordingly, there have been many researches in progress for developing a hydrogen storage medium and a hydrogen storage method for abruptly increasing hydrogen storage capacity in order to use the hydrogen as an energy source.

As a hydrogen storage method according to the related art, a liquid hydrogen storing method, a gaseous hydrogen storing method, an alloy based hydrogen storing method, and a carbon nanotube based hydrogen storing method have been introduced. The liquid hydrogen storing method and the gaseous hydrogen storing method may be dangerous because the liquid hydrogen and the gaseous hydrogen are highly explosive at normal temperature. Also, the liquid hydrogen storing method and the gaseous hydrogen method have the disadvantage of an expensive storage cost. The alloy based hydrogen storing method stores hydrogen in an alloy.

Although it can safely store the hydrogen, it has a limitation of commercialization because of a heavy weight and a small hydrogen storage surface area. The carbon nanotube based hydrogen storing method stores hydrogen in carbon nanotube. Since the carbon nanotube has a wider surface area than the alloy, more hydrogen can be stored using the carbon nanotube based hydrogen storing method. Carbon material in the carbon nanotube is very chemically stable. Therefore, it is difficult to absorb the hydrogen into the carbon nanotube and to desorb the hydrogen from the carbon nanotube after the hydrogen gas is absorbed to the carbon nano tube. Therefore, the hydrogen storage capacity may become reduced.

DISCLOSURE OF INVENTION

Technical Problem

An embodiment of the present invention is directed to providing a gas storage medium, a gas storage apparatus having the same, and a method thereof for improving the efficiency of storing a gas by sufficiently securing a surface area for storing a gas.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a gas storage medium including: a plurality of material layers each having a variable valence, wherein each of the material layers includes redundant electrons that are not participated in chemical bonding.

In accordance with another aspect of the present invention, there is provided a gas storage apparatus including: a chamber; a gas storage medium disposed in the chamber; a heating member for heating the gas storage medium; and a cooling member for cooling the gas storage medium, wherein the gas storage medium includes a plurality of material layers each having a variable valence and each of the material layers include redundant electrons that are not participated in chemical bonding.

In accordance with still another aspect of the present invention, there is provided a method for storing a gas using a gas storage apparatus including a chamber, a gas storage medium disposed in the chamber, a heating member for heating the gas storage medium, and a cooling member for cooling the gas storage medium, including the steps of: heating a gas storage medium through a heating member; inserting and storing a target material to the gas storage medium; and storing the target material in the gas storage medium by cooling the gas storage medium through the cooling member.

Advantageous Effects

A gas storage medium, a gas storage apparatus having the same and a method thereof according to the present invention provide following advantageous effects.

The gas storage medium includes a plurality of material layers each having a variable valence and separated at a predetermined distance. The layered structure thereof enables to secure a large surface area through a space formed between adjacent layers. Therefore, the efficiency of storing gas is improved.

In the gas storage medium having the multilayered structure according to the present invention, an absorbable/desorbable material is previously filled between layers, and the absorbable/desorbable material is desorbed therefrom before a gas is stored. Therefore, the efficiency of storing a gas is improved by easily storing a chemically stable gas into the vacant space.

BEST MODE FOR CARRYING OUT THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
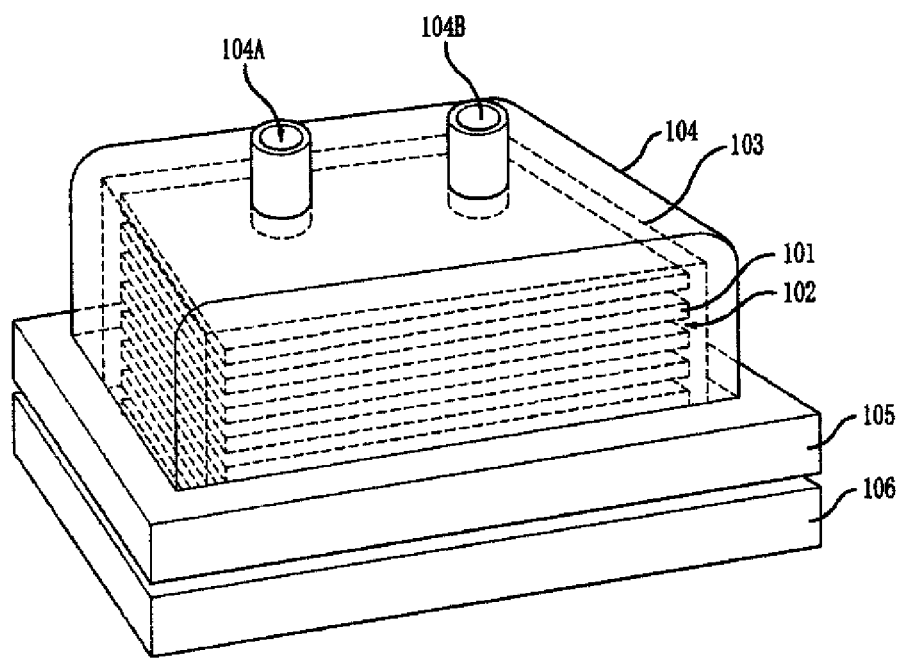
FIG. 1 is a diagram illustrating a gas storage apparatus in accordance with an embodiment of the present invention.
Figure 2:
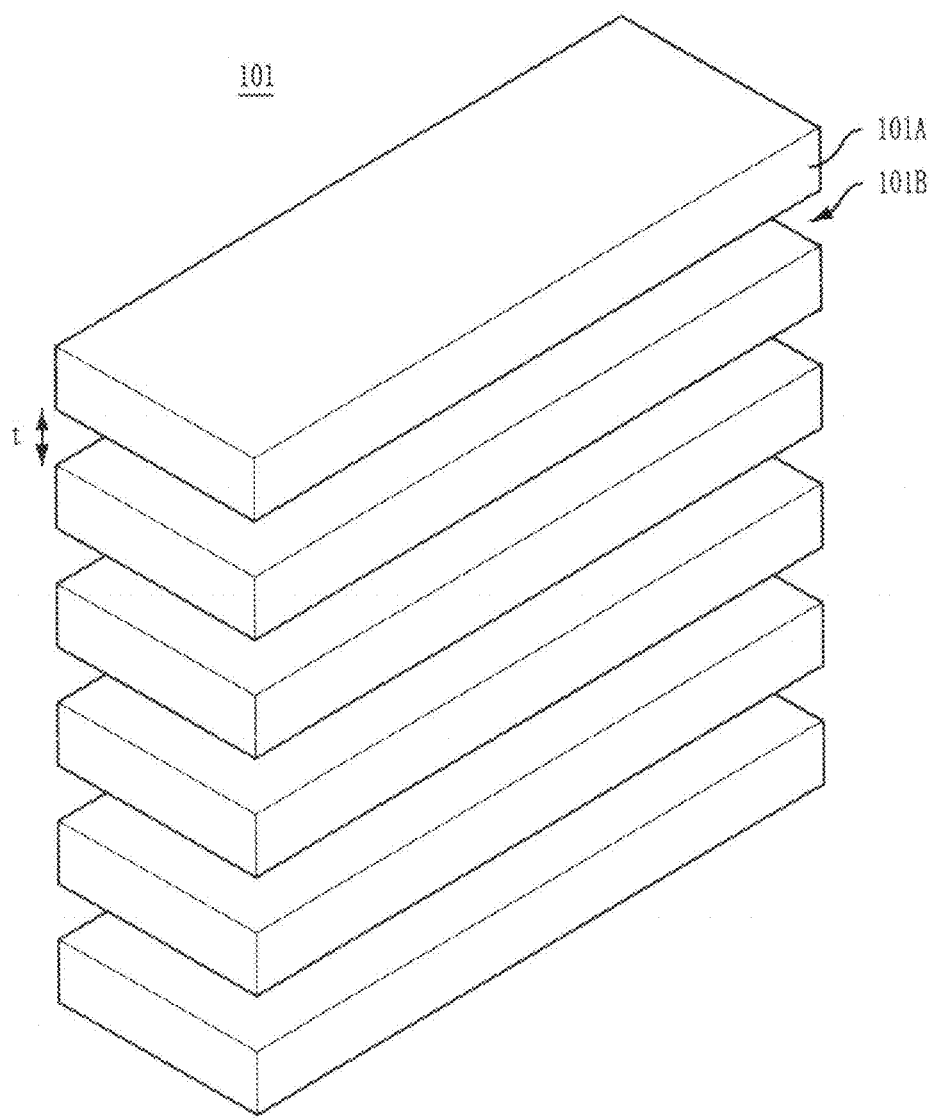
FIG. 2 is a magnified view of gas storage medium shown in FIG. 1.

FIG. 1 is a diagram illustrating a gas storage apparatus in accordance with an embodiment of the present invention, and FIG. 2 is a magnified view of gas storage medium 101 shown in FIG. 1.

Referring to FIGS. 1 and 2, the gas storage apparatus according to the present embodiment includes a gas storage medium 101 formed in a layered structure. That is, the gas storage medium 101 includes a plurality of material layers 10IA each made of material having a variable valence and separated at a predetermined distance. The material layer 10IA must have redundant electrons that are not participated in chemical bond. Also, additional support members (not shown) may be disposed at a space 102 between the material layers 101A.

In the present embodiment, the gas storage medium 101 is a material having a multilayer structure. For example, the gas storage medium 101 includes a plurality of thin film material layers 10IA and spaces 101B each formed between two adjacent thin film material layers 10IA.

Graphite, widely known materials, also has a layered structure that includes spaces like the spaces 101B of FIG. 2. However, the graphite cannot be used as a gas storage medium although the graphite can store material such as hydrogen at the spaces thereof because the graphite is stably combined with carbon. That is, it is difficult to adsorb/desorb material such as hydrogen into/from the graphite before/after the graphite absorbs the material like hydrogen.

In the present invention, a target material to store is stored in a gas storage medium having a multilayered structure using physical and chemical attractions that are generated by redundant electrons.

For example, vanadium pentoxide is a transition metal having a layered structure. When the vanadium chemically bonds with another material, the vanadium has pentavalent or tetrad according to how the vanadium bonds with oxygen. When the vanadium/oxygen bond has a defected part due to the variation of vanadium valence, the redundant electrons thereof wander around. Such redundant electrons have characteristics of easily absorbing molecules or atoms which are entered from the outside. That is, the redundant electrons easily absorb a material to store.

If adjacent two vanadium layers are separated at a comparative long distance such as several micrometers, the chemical bond thereof are not strong enough to influence to the next vanadium layers. Therefore, instable chemical bonds having redundant electrons clash with the other chemical bonds, thereby eliminating the instability thereof. Furthermore, the desorbing power of an absorbed material is stronger than the absorptive power of a desorbed material when the layers are separated at a comparative long distance. Therefore, the absorptive power becomes degraded. That is, the absorptive power increases by the attraction of the layers when materials are absorbed between layers. However, if the layers are separated wider, the absorptive power decreases because the attraction of two layers is reduced to the attraction of one layer.

In case of chemical bond of vanadium and oxygen, the chemical balance of $V_2O_3$ is +3, and the chemical balance of $VO_2$ is +4. Also, the chemical balance of $V_2O_5$ is a predetermined ratio of +4 and +5 of vanadium. Such vanadium/oxygen bond has redundant electrons according to the variation of a valence, and the redundant electrons act as attraction for absorbing material.

Therefore, when a material having a variable valence and redundant electrons has a layered structure, the material can easily absorb another material. Also, absorbed material can be easily desorbed because the absorbed material does not form strong chemical bond. That is, such physical and chemical bond is one of covalent bond, van der waals bond, ionic bond, hydrogen bond, or metallic bond. In addition, Such physical and chemical bonding can be easily broken by the evacuation and the heating of the material.

Meanwhile, it is very important to secure a space to absorb a material including hydrogen. Such a space can be secured when a material forms in a layered structure that includes a plurality of layers separated at a predetermined distance. In this space, a material forms physical and chemical bond according to the valence thereof. Here, the physical and the chemical bond includes covalent bond, van der waals bond, ionic bond, hydrogen bond, or metallic bond.

As described above, the gas storage medium 101 includes a plurality of material layers 101A. Each of the material layers 101A may be made of the same material or different materials, for example, more than two materials. As the material layer 101A, nanowire crystalline (that is, nanowire having a crystalline structure) may be used. The nanowire crystalline may be formed in a nano thin film, a bulk, or a film. Also, the nanowire crystalline is smaller than 500 $nm^2$. Preferably, the nanowire crystalline is smaller than 100 $nm^2$. The nanowire crystalline includes at least one of cross section having an aspect ratio (length:width) larger than 10. Preferably, the aspect ratio may be larger than 50. More preferably, the aspect ratio may be larger than 100. Furthermore, the nanowire crystalline may be made of a material selected from the group of materials consisting of semiconductor nano materials, transition metal compounds, and transition metal oxides. As the transition metal, Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg are used. If the material to be stored is hydrogen, the material of the nanowire crystalline may be made of Pt/Pd chemical compound For example, the semiconductor nano material may be made of material selected from the group consisting of Si, Ge, Sn, Se, Te, B, C (including diamond), P, B—C, B—P(BP$_6$), B—Si, Si—C, Si—Ge, Si—Sn, Ge—Sn, SiC, BN/BP/BAs, AlN/AlP/AlAs/AlSb, GaN/GaP/GaAs/GaSb, InN/InP/InAs/InSb, BN/BP/BAs, AlN/AlP/AlAs/AlSb, GaN/GaP/GaAs/GaSb, InN/InP/InAs/InSb, ZnO/ZnS/ZnSe/ZnTe, CdS/CdSe/CdTe, HgS/HgSe/HgTe, BeS/BeSe/BeTe/MgS/MgSe, GeS, GeSe, GeTe, SnS, SnSe, SnTe, PbO, PbS, PbSe, PbTe, CuF, CuCl, CuBr, CuI, AgF, AgCl, AgBr, AgI, BeSiN$_2$, CaCN$_2$, ZnGeP$_2$, CdSnAs$_2$, ZnSnSb$_2$, CuGeP$_3$, CuSi$_2$P$_3$, (Cu, Ag)(Al, Ga, In, Ti, Fe)(S, Se, Te)$_2$, Si$_3$N$_4$, Ge$_3$N$_4$, Al$_2$O$_3$, (Al, Ga, In)$_2$(S, Se, Te)$_3$, Al$_2$CO and composition thereof.

The transition metal compound may be made of a material selected from the group consisting of Ni compound (for example, LaNi$_5$, MnNi$_3$, Mg$_2$Ni), Ti compound (for example, TiMn$_2$, TiV$_2$, TiFe, TiCo, TiVCr, TiVMn), Cu compound (for example, Mg$_2$Cu), Zr compound (for example, ZrMn$_2$, and ZrV$_2$), and Li compound (for example, LiAl), which are stable transition metal compound.

The transition metal oxide may be vanadium oxide such as VO$_2$, V$_2$O$_3$, and V$_2$O$_5$. That is, the transition metal oxide may be the vanadium oxide having a valence that can be transformed to redundant valence.

Pt or Pd compound may be made of material selected from the group consisting of transition metal compound such as Pt or Pd and oxide. For example, although material such as Pt or Pd absorbs hydrogen in a hydrogen sensor, the Pt or Pd cannot be used as adsorbent. However, if such compound forms a layered structure, it is possible to absorb another material. Also, if a material has a pair of redundant electrons like a transition metal, the redundant electrons increase the absorptive power when material such as hydrogen is absorbed in the material such as Pt or Pd, thereby reducing a ratio of desorbing the material.

Meanwhile, it is possible to form a bond structure and a related valence in transition metal compounds and the transition metal oxides through impurity ion doping. Such an ion doping can be performed when a sample is synthesized. Or an ion implantation process may be performed using the transit lion metal ion after the sample is synthesized. In case of a vanadium pentoxide nanowire, a material where Pt or Pd exists in molecule type is injected between the layers in order to improve adsorptive power.

Figure 3:
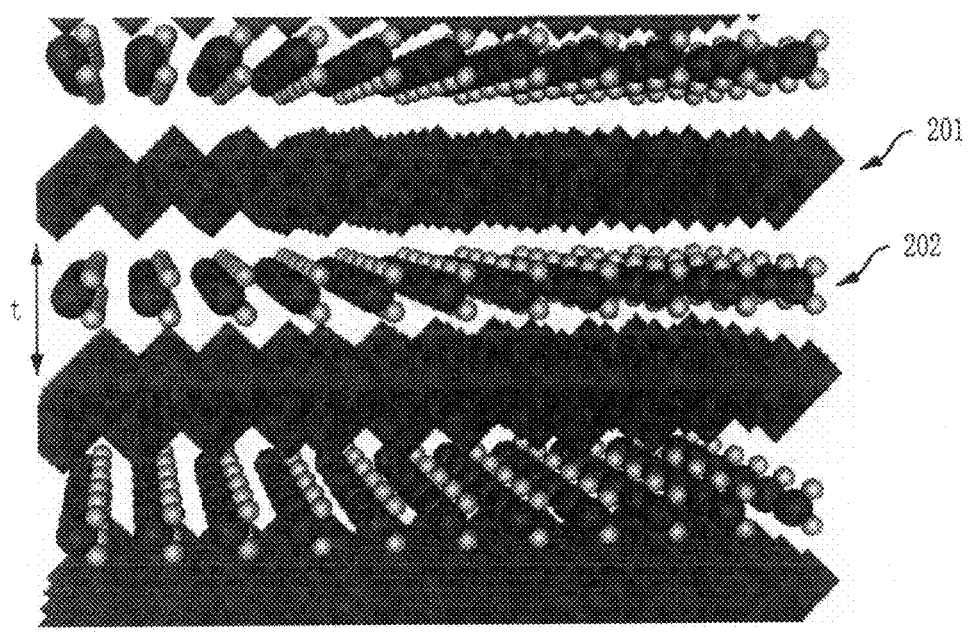
FIGS. 3 and 4 are diagrams depicting vanadium pentoxide nanowire crystalline structure.
Figure 4:
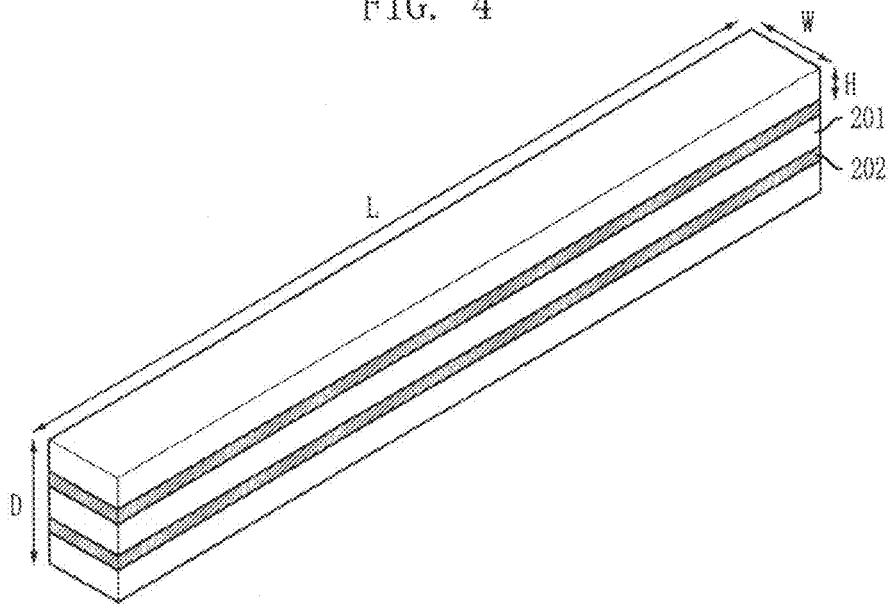

As shown in FIGS. 3 and 4, the vanadium pentoxide nanowire structure includes vanadium pentoxide nanowire crystalline layers 201 and water 202 between the layers 201, which is included when related samples are synthesized. The distance t between the vanadium pentoxide nanowire crystalline layers 201 is about Q67 nm, and the thickness of the vanadium pentoxide nanowire crystalline layer 201 is about Q48 nm. The distance t between the vanadium pentoxide nanowire crystalline layers 201 may be controlled when the water 202 is trapped or desorbed. Here, the distance t must be short enough to allow the attraction of both vanadium pentoxide nanowire crystalline layers 201 to react to each other. If the distance t is longer than about several nanometers, the attraction thereof barely reacts to each other. Therefore, the distance t between the vanadium pentoxide nanowire crystalline 201 must be shorter than 100 nm. Preferably, the distance t may be in a range from about Q1 to 100 nm. FIG. 4 clearly shows that the vanadium pentoxide nanowire crystalline 201 is crystallized in a shape of a rod. A plurality of the rod shaped crystalline form a bulk shape which is a proper shape to store material.

The nanowire crystalline of the gas storage medium 101 includes all nanowire crystalline that have server nanometers of a width and a height (or thickness) and several tens micrometers of a length L.

In generation, a thin film based layered structure is formed by stacking one thin film on the other thin film. So, it is difficult to store or insert new material between thin films. Compared to the thin film based layered structure, a nanowire crystalline based layered structure request much less energy to absorb material between nanowires because the nanowire crystalline is much thinner than a thin film in general.

The gas storage medium 101 according to the present embodiment is not limited to nanowire crystalline having nanometer height and width. The gas storage medium 101 may include all thin film layered structure made of the nanowire crystalline having nanometer height and width. In the thin film based layered structure, a plurality of thin films are uniformed disposed. The layered structure may include any thin film having a width of server millimeters or centimeters. If the widths of the nanowire crystalline are several nanometers or several tens nanometers and a single crystal has a several micrometer, a material having hydrogen can be stored.

Also, it is possible to form one layer to have a width in a range from several nanometers to several tens centimeters and a length in a range from several tens nanometers and several hundreds centimeters. Here, the thickness of single crystal or a thin film, which is a distance between two adjacent layers must be about several nanometers. The distance between the layers must be several nanometers because material such as hydrogen must be stably bonded chemically and physically. If a gas storage medium has a form of a tube or a hollow pipe, it is possible to form the tube or the pipe shaped gas storage medium to have a diameter of several hundreds nanometers.

Also, the structure of the gas storage medium 101 according to the present invention is not limited to a flat board shape. The gas storage medium 101 according to the present invention may be formed in various shapes including a curved flat board shape, a hollow cylindrical shape, a solid cylinder shape, and a sphere shape. It is preferable that each structure of the gas storage medium 101 according to the present invention includes a crystalline structure that has a crystallized part having a cross section area of a nanometer.

As described above, the gas storage medium 101 includes a multilayered nanowire crystalline and absorbable/desorbable materials physically and chemically bonded between two adjacent layers. The multilayered nanowire crystalline includes a layered structure where a plurality of semi conductive or conductive compound layers are stacked thereon. The stacked layers may be made of the same material or more than two different materials. For example, when a transition metal compounds with a material such as Pt or Pd, which react with hydrogen, the transition metal/Pt or Pd bond may have conductivity or semiconductivity as electrical characteristics. If such a material having the electrical characteristics is disposed in a layered structure, it can operate as a gas storage medium.

If nanowire crystalline is formed in a flat thin film, it is preferable that the distance between layers is about 1 nm to 100 nm. If nanowire crystalline is formed in a circle shape, it is preferable that a diameter thereof is about 1 nm to 1 μm. The suggested distance and diameter is a distance for sustaining the effective absorption or desorption of material to store based on chemical or physical attraction. And, nanowire crystalline between layers may have a width in a range from several nanometers to several micrometers, and the size thereof is not limited. That is, the nanowire crystalline between the layers may be several centimeters. The height of nanowire crystalline is not limited to the size thereof. The nanowire crystalline may be formed of a plurality of single crystals. Such a structure is also not limited to the size thereof. In such a nanowire crystalline, the adsorptive power is enhanced by changing a distance between layers when a material is absorbed between the layers. Accordingly, it is possible to overcome the shortcoming that the absorbed material is externally desorbed. For example, vanadium pentoxide nanowire crystalline can change a distance between crystalline layers when the vanadium pentoxide nanowire crystalline absorbs a gas from outside.

Hereinafter, a method for manufacturing gas storage medium 101 according to the present invention will be described.

A gas storage medium 101 may be formed using one selected from the group consisting of a metal oxide, a semiconductor oxide, transition metal compounds, and transition metal oxides. An ion-exchange resin or solvent is additionally added therein to form the gas storage medium 101. Here, the ion-exchange resin helps metal oxides or semiconductor oxides to grow. Also, the solvent safely arrives between nanowire crystalline, thereby forming a nanowire crystalline including a metal oxide crystalline, a semiconductor oxide crystalline, and solvent-metal (or semiconductor) oxide crystalline.

The gas storage medium 101 may be formed by a sol-gel method, sputtering, or chemical or physical depositing method. The sol-gel method is used to form the nanowire crystalline in a film or a bulk. Also, the sol-gel method can grow the nanowire crystalline in a thin film. That is, a space is formed between layers by stacking a layer on the other, thereby forming the gas storage medium 101. Also, a space may be formed by forming sacrificial layer between the nanowire crystalline layers and removing the sacrificial layer after forming the nanowire crystalline layers. For example, a silicon oxide layer or a silicon nitride layer is formed between nanowire crystalline layers as the sacrificial layer, and the silicon oxide layer or the silicon nitride layer is removed therefrom.

Also, the gas storage medium 101 may be formed in a bulk type for improving a cohesive power between adjacent nanowire crystalline layers using a nano particle, a molecule, or a polymer.

Meanwhile, the multilayered nanowire crystalline is formed in a nano thin film, a pellet, or a film. The nano thin film of the nanowire crystalline may be formed by a spray method, a spin coating method, and an absorptive method using dropping pipettes.

When nanowire crystalline and nano compound are included in a solvent, the solvent is completely evaporated or removed. Then, the nanowire crystalline and the nano compound are putted into a predetermined mold, and the pellet type structure thereof is formed by pressurizing the nanowire crystalline and the nano compound in the predetermined mold. When nanowire crystalline and nano compound are included in a solvent, a film type structure may be formed by removing the solvent through filtering the solvent through a predetermined filter. Also, an nano thin film type structure may be formed using the spin coating method, the absorptive method using dropping pipettes, and the spray method.

The spin coating method is a method for absorbing the nanowire crystalline into porous material or mesh shaped material. A thin film having a compositive stacking structure may be formed by properly controlling the number of spin coating. That is, the nanowire crystalline is absorbed into the porous material, another porous material is stacked thereon, and the nanowire crystalline is absorbed into the porous material again in the spin coating method.

The spray method is a method for forming a thin film at a porous material or a mesh shaped material by spraying nanowire crystalline thereto. That is, the nanowire crystalline is absorbed into the porous material by spraying the nanowire crystalline thereto. Then, another porous material is stacked thereon, and another thin film is formed by spraying nanowire crystalline.

In order to stably form a plurality of nanowire crystalline layers, the gas storage medium 101 may include an absorbable/desorbable material such as water molecule between nanowire crystalline layers for enabling adjacent layers to support each others. Here, the absorbable/desorbable material bonds to the nanowire crystalline layers through chemical bonding or physical bonding. As described above, the amorphous or the absorbable/desorbable material can be desorbed a plurality of the nanowire crystalline layers in the gas storage medium 101 through a thermal process. After desorbing the material from the nanowire crystalline layers, an empty space is formed between the nanowire crystalline layers. Predetermined material having hydrogen can be stored in the empty space between the nanowire crystalline layers.

In order to effectively absorb a material having hydrogen between the nanowire crystalline layers, the surface of the nanowire crystalline layer may be processed. Molecules having silane, amine, or carboxyl may used for processing the surface thereof. For example, aminopropyltriethoxysilane (APTES) and aminopropyltrimethoxysilane (APTMS) may be used as the molecule having the silane. Such molecules increase the attraction between two adjacent nanowire crystals thereby stably sustaining the material having hydrogen.

In order to enhance an absorptive power, a material having a wide surface area is mixed into a solvent when a nanowire crystals are formed, instead of processing the surface of the nanowire crystalline layer. Here, the material having the wide surface area is a material having a surface area of about several $nm^2$ to several thousands $\mu m^2$, for example, about 1 $nm^2$ to $10000/M^2$. That is, the material having a wide surface area includes polymer such as polypyrrole, polyacetylene, and polyethylene, carbon nano tube, conductive and nonconductive nanowire, pentacene, and organic material such as naphthalene.

Such materials are mixed with a solvent when the nanowire crystals are formed. The materials enhance a cohesive force and a surface area of the nanowire crystals, thereby enlarging the storage capacity of a material. For example, since a nano size of a polypyrrole material can be manufactured using an electrochemical method, a nanowire-polypyrrole composition is crystallized by inserting nanowires into polypyrrole when the polypyrrole is composed. As a result, the cohesive force between the nanowire crystals is enhanced. After a material to store is absorbed between the nanowire crystals, it is difficult to desorb the material from the nanowire crystals.

As show in FIG. 1, the gas storage apparatus according to the present embodiment may further includes a heating member 105. The heating member 105 is disposed at a lower part of the gas storage medium 101. The heating member 105 applies heat for desorbing a desorbable material from a material 101A having variable valence the nanowire crystalline layers. For example, the heating member 105 applies heat for desorbing a material having hydrogen from the nanowire crystalline layers.

The bonding of the nanowire crystalline layer and the desorbable material is broken by the heat applied from the heating member 105. That is, the nanowire crystalline layers are vibrated by heating the nanowire crystalline layers. The vibration of the nanowire crystalline layers breaks the attraction of the nanowire crystalline layers, thereby breaking the bonding of the nanowire crystalline layers and the absorbable/desorbable material. A predetermined surface area is created when the absorbable/desorbable material is desorbed from the nanowire crystalline layers. The size of the surface area is about equivalent to that of the overall nanowire crystalline. The material having hydrogen can be stored in a space formed between the nanowire crystalline layers.

The gas storage apparatus according to the present embodiment further includes a cooling member 106. The cooling member 106 cools down the gas storage medium 101 for absorbing a material having hydrogen between the nanowire crystalline layers. The gas storage medium 101 narrows a distance between the nanowire crystalline layers. That is, the cooling member 106 minimizes the distance between molecules of a material having hydrogen in order to enable the material having hydrogen to be effectively absorbed.

The gas storage apparatus according to the present embodiment may further include a chamber 104 for inserting a material having hydrogen into the gas storage medium 101 or discharging a target material having hydrogen from the gas storage medium 101 as well as protecting the gas storage medium 101. The chamber 104 includes an inlet 104a for inserting an absorbable/desorbable material or a target material having hydrogen into the gas storage medium 101 and an outlet 104b for discharging desorbed material from the gas storage medium 101. Here, the chamber 104 may include one opening as the inlet 104a and the outlet 104b.

The gas storage apparatus according to the present embodiment may further includes a supporting member 103 for supporting the multilayered nanowire crystalline structure of the gas storage medium 101. Here, the supporting member 103 may be formed in a three dimensional (3-D) polygon such as a triangle, a rectangle, a square, a pentagon, and an octagon. Or, the supporting member 103 may formed in a cylindrical chamber. The supporting member 103 is disposed inside the chamber 104. The upper part of the supporting member 103 is opened for exposing the nanowire crystalline layers, thereby communicating with the inlet 104a and the outlet 104b of the chamber 104.

Hereinafter, the operations of a gas storage apparatus according to the present embodiment will be described.

At first, a distance between layers in the gas storage medium 101 is maximized by increasing the internal temperature of the gas storage medium 101 through the heating member 105. Then, the internal pressure of the chamber 104 increases at higher than 1 atmosphere pressure by inserting a gas into the chamber through the inlet 104a of the chamber 104. After increasing the internal pressure, the heating member 105 is interrupted while cooling down the gas storage medium 101 through the cooling member 106. Here, a distance between molecules of a material to store is minimized with the internal pressure of the gas storage medium 101 sustained while decreasing the temperature. As a result, a material having hydrogen is stored in the gas storage medium 101. Then, the gas storage medium 101 is heated through the heating member 105 to discharge material stored or absorbed in the gas storage medium 101.

As shown in FIG. 2, the gas storage medium 101 includes a plurality of nanowire crystalline layers 10IA each having a variable valence and empty spaces 101B formed between two adjacent material layers 10IA for absorbing a predetermined material. The empty space 101B may be formed as an absorbable/desorbable material that physically and chemically bonds with nanowire crystalline layers. Or, the empty space 101B may be formed as an empty structure when the gas storage medium 101 is manufactured.

The absorbable/desorbable material is desorbed from the nanowire crystalline layers. As a result, an empty space is formed between the nanowire crystalline layers. Then, a target material is stored in the empty space between the nanowire crystalline layers. That is, the gas storage medium 101 is heated and a vacuum state is formed in the chamber by applying heating and evacuation. As a result, the distance between the nanowire crystalline layers extends due to the increment of heat energy, and the absorbed material between the nanowire crystalline layers is separated.

Then, a material having hydrogen is stored in the empty space formed after discharging the material absorbed between the nanowire crystalline layers. For example, gases such as hydrogen molecule, oxygen molecule, nitrogen molecule, and helium molecule, or a material that is smaller or slightly larger than the distance between the nanowire crystalline layers. Here, the nanowire crystalline layers are vibrated when a high temperature thermal process is performed. Such vibration makes the distance between the nanowire crystalline layers longer. Therefore, a material slightly larger than the distance between the nanowire crystalline layers can be stored in the gas storage medium 1IQ. Also, the distance between the nanowire crystalline layers may vary after a material having hydrogen is stored.

Hereinafter, a method for storing a target material after removing a material absorbed between nanowire crystalline layers and a method for discharging a material stored between nanowire crystalline layers will be described.

Figure 5:
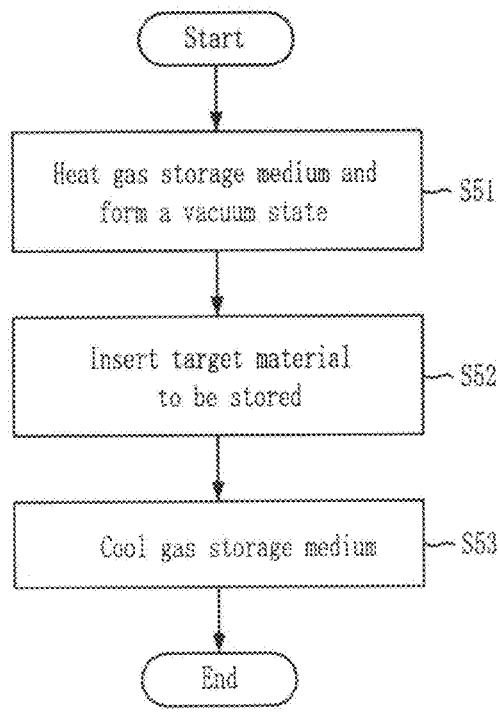
FIG. 5 is a flowchart illustrating a method for storing a gas in accordance with an embodiment of the present invention.

Referring to FIGS. 1 and 5, the gas storage medium 101 is disposed inside the chamber 104 to contact the heating member 105 and the cooling member 106 after forming the gas storage medium 101.

At first, a vacuum state is formed inside the chamber 104 of the gas storage apparatus by opening the outlet 104b using a discharge valve (not shown). Then, a material absorbed between the nanowire crystalline layers is removed by heating the gas storage medium 101 through the heating member 105 at step S51.

Then, the outlet 104b is closed, and a target material to store is inserted into the chamber 104 by opening the inlet 104a using an inlet valve (not shown) at step S52. Here, an atmosphere pressure is higher than the ambient pressure. The pressure is controlled according to the amount of the material to store.

Then, the internal temperature decreases by opening the inlet 104A while pressurizing in order to make the material to be stably stored between the nanowire crystalline layers at step S53. Here, the heating member 105 is interrupted, and the internal temperature gradually decreases using the cooling member 106. Also, the amount of absorbing material increases while decreasing the temperature, and the chamber is continuously pressurized in order to compensate the pressure that continuously decreases.

As described above, a material is stored in the gas storage medium 101 by removing the absorbed material between the nanowire crystalline layers and storing the target material in an empty space between the nanowire crystalline layers, which is formed by the removed material.

For example, hydrogen can be stored in the gas storage medium 101 at a normal temperature, for example, about 21° C. to 23° C. However, the hydrogen can be more effectively stored if the temperature of the gas storage medium 101 decreases with a predetermined pressure after absorbing the hydrogen in the gas storage medium 101. It is preferable to decrease the temperature of the gas storage medium 101 to 4.2K° C., or more preferably to 77K which is the temperature of a liquid nitrogen. Accordingly, the method for storing a target material may further include the step of cooling down the internal temperature of the gas storage medium 101 to a normal temperature or the extremely low temperature including a temperature of liquid nitrogen before the step S52 in order to increase the amount of hydrogen to insert.

At the step S51, one of a process of heating the gas storage medium and a process of forming a vacuum state in the chamber may be performed to desorb the absorbed material from the nanowire crystalline layers. However, the absorbed material is further effectively desorbed from the nanowire crystalline layers if both of a process of heating the gas storage medium and a process of forming a vacuum state in the chamber are performed together.

Here, the process of heating the gas storage medium is performed using the heating member 105 disposed at the lower part of the gas storage medium 105. The gas storage medium may be heated in a range of temperatures that do not melt the nanowire crystalline layers down. If the vacuum state is formed in the chamber of the gas storage medium 101 while heating the gas storage medium 101 using the heating member 105, the distance between the nanowire crystalline layers can be further widened, thereby further effectively securing a storage space. Here, the higher the degree of vacuum is, the wider the storage space is secured. It is preferable that a pressure is in a range of 1 to 700 atm or to a limit pressure that the supporting member 103 can stand.

Figure 6:
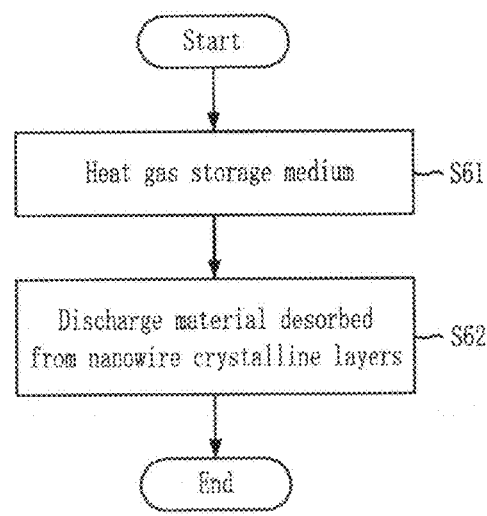
FIG. 6 is a flowchart illustrating a method for discharging a gas in accordance with an embodiment of the present invention.

FIG. 6 is a flowchart of a method of discharging a gas from nanowire crystalline layers in accordance with an embodiment of the present invention.

Referring to FIG. 6, the internal temperature of the chamber increases by heating the gas storage medium 101 with a predetermined stored using the heating member 105, and the material desorbed from the nanowire crystalline layers is discharged by opening the outlet 104B using a discharge valve at steps S61 and S62. Here, if the concentration of the target material is higher than the concentration of absorbing the target material, the desorbed material can be discharged without increasing the temperature thereof.

Hereinafter, the gas storage apparatus according to the present embodiment will be described through exemplary experimentations.

EXEMPLARY EXPERIMENTATION

D Observation of Vanadium Nanowire Crystalline Structure

Figure 7:
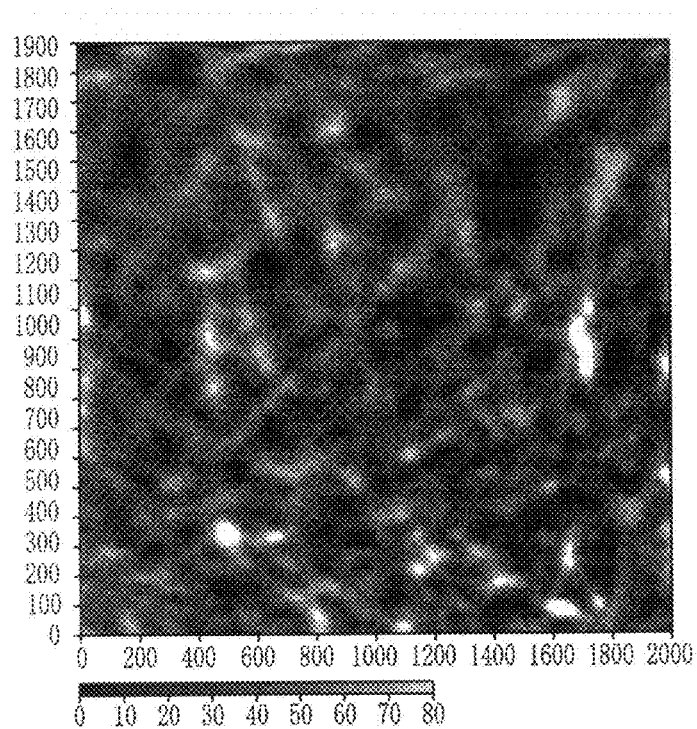
FIG. 7 is an AFM picture of a vanadium pentoxide nanowire crystalline structure exemplary formed in accordance with an embodiment of the present invention.

FIG. 7 is a picture of a vanadium nanowire crystalline structure in a gas storage medium according to an embodiment of the present invention. The picture is taken by an atomic force microscope (AFM) Referring to FIG. 7, the vanadium nanowire crystalline is formed in a mesh network. The length of individual nanowire crystalline is longer than a micro meter. Here, the nanowire crystalline has a rectangular parallelepiped shape in where the width of the nanowire crystalline is several tens nano meters, the height of the nanowire crystalline is from several nano meters to several tens nano meters, and the length of the nanowire crystalline is from several micrometers to several tens micrometers.

D Measuring a Storage Capacity of a Vanadium Nanowire Crystalline

Figure 8:
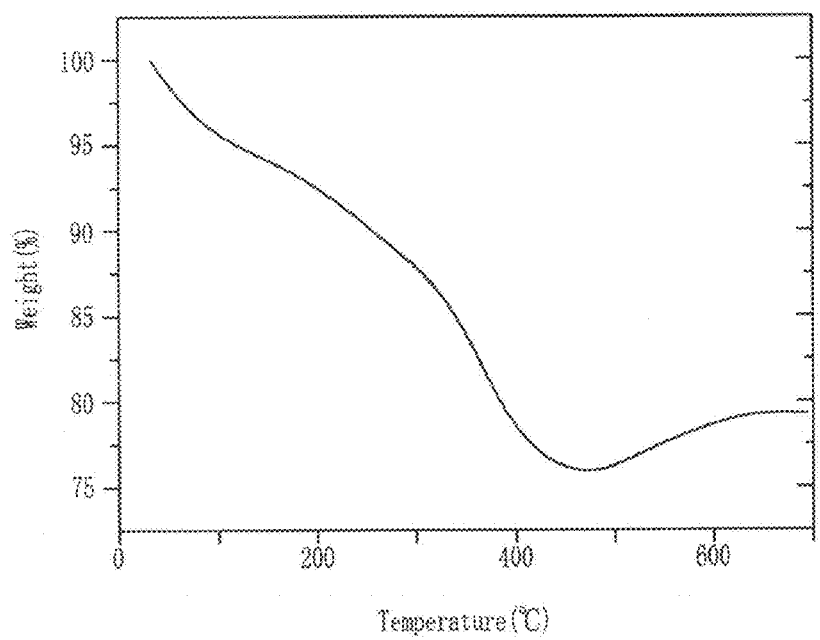
FIG. 8 is a graph showing a TGA (Thermo Gravimetric Analysis) based hydrogen storage capacity of a vanadium pentoxide nanowire crystalline formed in accordance with an embodiment of the present invention.

Thermogravimetric analysis (TGA) is performed to analyze the hydrogen capacity of a gas storage apparatus having the gas storage medium formed in the exemplary experiment. FIG. 8 is a graph showing the result of analyzing the hydrogen capacity. Information about sample composition analysis and thermal stability is provided by measuring weight variation (weight ratio) according to a temperature weight ratio in the experiment. In the experiment, the maximum hydrogen storage capacity of a gas storage medium is measured by comparing a weight of the gas storage with an absorbable/desorbable material filled before storing the hydrogen with that of the gas storage with the absorbable/desorbable material removed.

That is, a solvent included in the vanadium nanowire crystalline is completely removed, and the vanadium nanowire crystalline is inserted into the TGA. Then, a temperature thereof gradually increases from 0° C. to 700° C. As shown in FIG. 8, the weight of the vanadium nanowire crystalline decreases from 100 wt % to 75 wt % at about 500° C. It means the water absorbed in the vanadium nanowire crystalline is completely removed. That is, the minimum gas storage medium is about 75 wt %. Based on the result, the gas storage medium can maximally store about 25 wt % of hydrogen.

Figure 9:
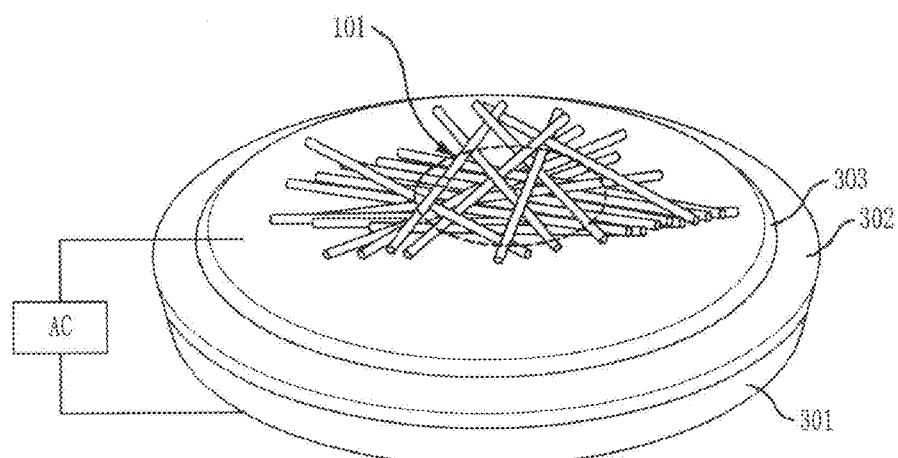
FIG. 9 is a diagram illustrating a mass spectrograph for measuring a hydrogen storage capacity.

Various methods for measuring hydrogen stored in a gas storage medium were introduced. Herein, a Quartz Crystal Microvalve (QCM) mass spectrograph is used in the experiment to measure the hydrogen storage capacity. FIG. 9 shows the configuration of the QCM mass spectrograph.

Referring to FIG. 9, the QCM mass spectrograph includes two electrodes 301 and 303 and a quartz oscillator 302. The quartz oscillator 302 is vibrated by applying an alternative current (AC) to the electrodes 301 and 303, and an oscillation frequency that induces resonance is decided. Here, the resonance frequency of the quartz oscillator 302 is about 9 MHz. The unique resonance frequency of a material changes if the material puts on the quartz oscillator 302. The variation of the resonance frequency is closely related to the variation of the weight. That is, Dm=−1.068 Df (ng). Here, '1.068' is a constant related to the characteristic of the quartz, and ng denotes a unit of nanogram.

As described above, the gas storage medium 103 puts on the QCM mass spectrograph and the response characteristics of the gas storage medium 103 is measured by making vibration using the oscillator. Such a QCM mass spectrograph may be heated or cooled down. The QCM mass spectrograph is disposed in the chamber and the response characteristics are measured at the outside of the chamber. Here, the decrement of the frequency means the increment of the weight. Also, the increment of the frequency means the decrement of the weight.

Helium Storage Capacity Analysis

Figure 10:
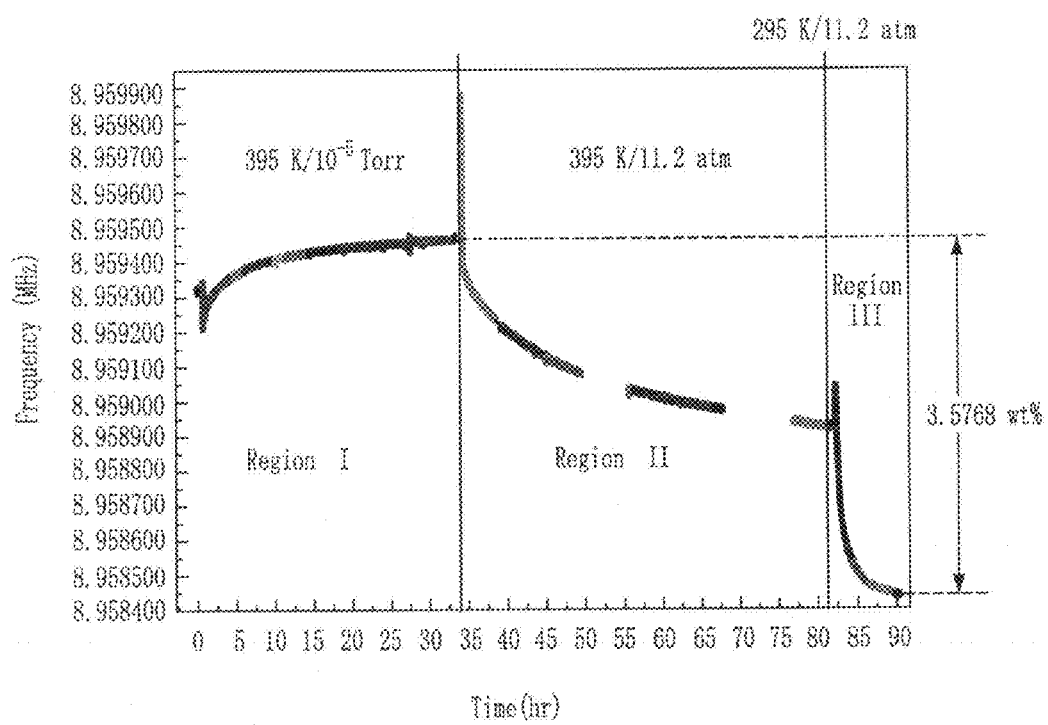
FIG. 10 is a graph showing helium storage characteristics of a vanadium pentoxide nanowire crystalline formed in accordance with an embodiment of the present invention.

FIG. 10 is a graph showing a helium storage capacity. In graph, an x-axis denotes a time, and a y-axis denotes a frequency.

Referring to FIG. 10, a temperature increases to 395K while sustaining a vacuum state at $10^{-5}$ torr in an area I. Then, the weight decreases because the frequency gradually increases when the temperature increases and the vacuum state is formed. It means that the gas storage medium is reduced in weight because the water included in the vanadium nanowire crystalline is removed. In an area II, the temperature is maintained and the pressure increase to 11.2 atm. Then, helium is absorbed into a space formed after the water is removed. That is, the frequency gradually decreases. In an area III, the pressure is sustained at 11.2 atm and the temperature decreases to 295K. Due to the decrement of the temperature, the frequency further decreases. Therefore, the amount of helium further increases. In conclusion, the weight ratio of the vanadium nanowire crystalline and the helium stored therein is about 3.5768 wt %, which can be calculated based on the relation between the frequency and weight. Such a result is obtained by correcting a weight ratio based on the pressure and the temperature after calculating the weight using the QCM mass spectrograph.

Hydrogen Storage Capacity Analysis

Figure 11:
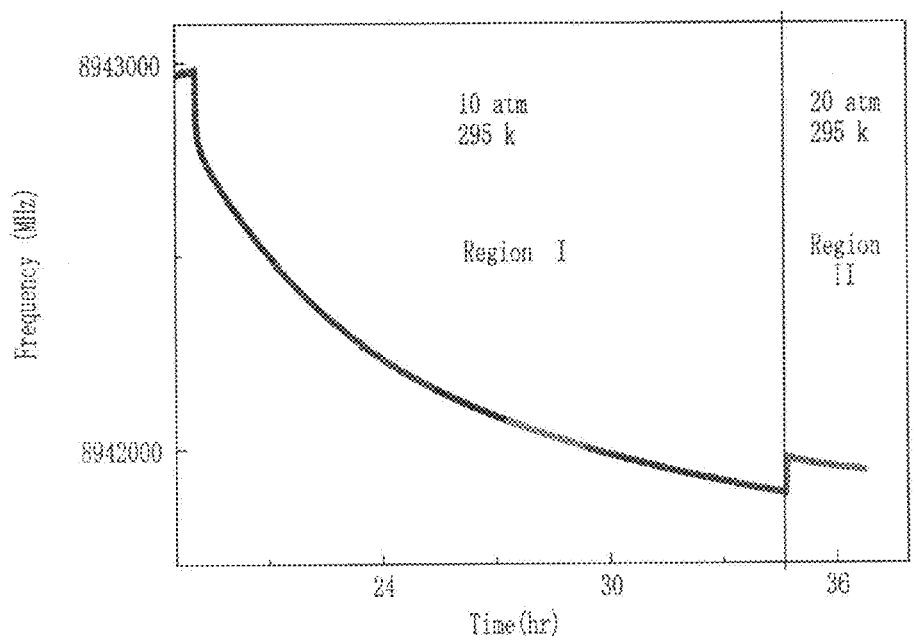
FIG. 11 is a graph showing hydrogen storage characteristics of a vanadium pentoxide nanowire crystalline formed in accordance with an embodiment of the present invention.

FIG. 11 is a graph showing a hydrogen storage capacity. In the graph, an x-axis denotes a time and a y-axis denotes a frequency.

Referring to FIG. 11, a temperature increases to 295K while a pressure is sustained at 10 atm in an area I. In an area II, the pressure increase to 20 atm with the temperature sustained. That is, the frequency is only changed. That is, like the helium storage capacity analysis, initial frequency variation is measured at the same pressure and temperature using the QCM mass spectrograph. Then, a frequency variation is measured after a predetermined material puts on the QCM mass spectrograph. Then, a weight is measured based on the difference between the initial frequency and the frequency varied when putting a predetermined material on the QCM mass spectrograph. As a result of such an experiment, the hydrogen storage capacity of the gas storage medium according to the present embodiment is calculated as about 1.611 wt %.

However, as shown in FIG. 11, the hydrogen can be stored under bad conditions in which the frequency gradually decreases, the pressure is comparatively low, for example, about 20 atm, and the temperature is the normal temperature. That is, it means that more hydrogen can be stored in the gas storage medium if the pressure increases and the temperature decreases to a temperature of liquid nitrogen.

In the present embodiment, the gas storage medium was described to include the vanadium pentoxide nanowire crystalline. However, the present invention is not limited thereto. As described above, the gas storage medium may include a storage medium made of the composition of transition metal or another metal with elements, a bulk type storage medium made of crystalline thereof and chemical compound made of pt or pd. That is, if the crystalline thereof has a multilayered structure that secures spaces between layers, these storage medium may be used as the gas storage medium according to the present embodiment. Also, a structure having a material that can be easily discharged when a sample is mixed may be used as the gas storage medium according to the present embodiment. Also, a structure including a material that can be easily removed after compositing may be used as the gas storage medium according to the present embodiment.

The present application contains subject matter related to Korean Patent Application Nos. 2006-0123238, and 2007-0094685, filed in the Korean Intellectual Property Office on Dec. 6, 2006, and Sep. 18, 2007, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A gas storage medium comprising:
a plurality of material layers each having a variable valence,
wherein each of the material layers includes redundant electrons that do not participate in chemical bonding and is made of nanowire crystalline,
wherein one of the material layers is made of a compound including a transition metal, the compound selected from the group consisting of $LaNi_5$, $MnNi_3$, $Mg_2Ni$, $TiMn_2$, $TiV_2$, $TiFe$, $TiCo$, $TiVCr$, $TiVMn$, $Mg_2Cu$, $ZrMn_2$, $ZrV_2$, and $LiAl$.

2. The gas storage medium of claim 1, further comprising an absorbable/desorbable material disposed between the material layers and chemically and physically bonded with the material layers in a molecular form.

3. The gas storage medium of claim 1, wherein each of the material layers is made of a different material.

4. The gas storage medium of claim 1, wherein the material layers are separated from each other by a distance of about 0.1 to 100 nm.

5. The gas storage medium of claim 1, wherein a target material to be stored in the gas storage medium chemically bonds with the nanowire crystalline in a space between adjacent material layers.

6. The gas storage medium of claim 5, wherein the chemical bond is one of an ionic bond, a metallic bond, and a van der Waals bond.

7. The gas storage medium of claim 1, wherein in the material layers other than the one layer, the nanowire crystalline is made of one selected from the group consisting of a semiconductor nano material, and a compound that includes a transition metal.

8. The gas storage medium of claim 7, wherein each of the material layers other than the one layer includes a material that includes a transition metal selected from the group of transition metals consisting of Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, and Hg.

9. The gas storage medium of claim 7, wherein each of the material layers other than the one layer is made of a compound that includes a transition metal, the compound selected from the group consisting of $LaNi_5$, $MnNi_3$, $Mg_2Ni$, $TiMn_2$, $TiV_2$, $TiFe$, $TiCo$, $TiVCr$, $TiVMn$, $Mg_2Cu$, $ZrMn_2$, $ZrV_2$, and $LiAl$.

10. The gas storage medium of claim 7, wherein the nanowire crystalline of each of the material layers other than the one layer is formed of a vanadium oxide.

11. The gas storage medium of claim 10, wherein the vanadium oxide is an oxide selected from the group consisting of $VO_2$, $V_2O_3$, and $V_2O_5$.

12. The gas storage medium of claim 7, wherein the nanowire crystalline of the plurality of material layers is doped with a doping material by ion implantation when a sample of the nanowire crystalline of the plurality of material layers synthesizes or after a sample of the nanowire crystalline of the plurality of material layers synthesizes.

13. The gas storage medium of claim 12, wherein the doping material is a transition metal in the form of an ion.

14. The gas storage medium of claim 7, wherein the nanowire crystalline is formed by adding an ion exchange resin to solvent.

15. The gas storage medium of claim 14, wherein the solvent includes a material having a surface area of 1 $nm^2$ to 10000 $\mu m^2$.

16. The gas storage medium of claim 14, wherein the solvent includes one selected from the group consisting of a carbon nanotube, a conductive nanowire, a non-conductive nanowire, and an organic material.

17. The gas storage medium of claim 14, wherein the solvent is mixed with at least a polymer selected from the group consisting of polypyrrole, polyacetylene, and polyethylene.

18. The gas storage medium of claim 1, wherein the nanowire crystalline is formed in a nano thin film, a pellet bulk, or a film.

19. A gas storage apparatus comprising:
a gas storage medium according to claim 1;
a heating member for heating the gas storage medium; and
a cooling member for cooling the gas storage medium.

20. A gas storage apparatus comprising:
a chamber;
a gas storage medium disposed in the chamber;
a heating member for heating the gas storage medium; and
a cooling member for cooling the gas storage medium,
wherein the gas storage medium includes a plurality of material layers each having a variable valence and each of the material layers includes redundant electrons that do not participate in chemical bonding.

21. The gas storage apparatus of claim 20, wherein the chamber includes:
an inlet for inserting a target material to store into the gas storage medium; and
an outlet for discharging the target material from the gas storage medium,
wherein the gas storage medium further includes a supporting member for supporting the material layers.

22. A method for storing a gas using a gas storage apparatus including a chamber, a gas storage medium disposed in the chamber, a heating member for heating the gas storage medium, and a cooling member for cooling the gas storage medium, comprising the steps of:
heating the gas storage medium through the heating member;
inserting a target material in the gas storage medium; and
storing the target material in the gas storage medium by cooling the gas storage medium through the cooling member.

23. The method of claim 22, further comprising the step of cooling the gas storage medium to a normal temperature before the step of inserting a target material.

24. The method of claim 22, wherein in the step of heating a gas storage medium, the inside of the gas storage medium is sustained in a vacuum state and, the gas storage medium is heated to desorb a material absorbed in the gas storage medium.

25. The method of claim 22, further comprising the step of discharging the material desorbed from the gas storage medium to an outside of the chamber.

* * * * *